US00RE45729E

(19) United States
(12) Reissued Patent
Oh et al.

(10) Patent Number: US RE45,729 E
(45) Date of Reissued Patent: Oct. 6, 2015

(54) APPARATUS AND METHOD FOR MANAGING APPLICATION CONTEXT

(75) Inventors: Byeong Thaek Oh, Daejeon (KR); Ho Jin Park, Daejeon (KR); Tae In Hwang, Daejeon (KR)

(73) Assignee: ELECTRONICS AND TELECOMMUNICATIONS RESEARCH INSTITUTE, Daejeon (KR)

(21) Appl. No.: 13/396,927

(22) Filed: Feb. 15, 2012

Related U.S. Patent Documents

Reissue of:
(64) Patent No.: 7,664,786
Issued: Feb. 16, 2010
Appl. No.: 11/602,021
Filed: Nov. 20, 2006

(30) Foreign Application Priority Data

Dec. 12, 2005 (KR) ..... 10-2005-0121814
May 9, 2006 (KR) ..... 10-2006-0041680

(51) Int. Cl.
*G06F 17/30* (2006.01)

(52) U.S. Cl.
CPC ..... *G06F 17/30079* (2013.01)

(58) Field of Classification Search
USPC ..... 707/609–610, 618, 620, 640
See application file for complete search history.

(56) References Cited

U.S. PATENT DOCUMENTS 5,918,229 A * 6/1999 Davis et al. ..... 705/27.1
5,987,506 A * 11/1999 Carter et al. ..... 709/213
6,026,474 A * 2/2000 Carter et al. ..... 711/202
6,148,377 A * 11/2000 Carter et al. ..... 711/147
6,598,134 B2 * 7/2003 Ofek et al. ..... 711/162
6,625,622 B1 * 9/2003 Henrickson et al. ..... 707/204
6,704,886 B1 * 3/2004 Gill et al. ..... 714/6
6,721,766 B1 * 4/2004 Gill et al. ..... 707/204
7,080,221 B1 * 7/2006 Todd et al. ..... 711/161
7,146,387 B1 * 12/2006 Russo et al. ..... 707/204

(Continued)

FOREIGN PATENT DOCUMENTS

KR 1020010068739 7/2001
KR 1020010068739 A 7/2001

OTHER PUBLICATIONS

Electronics and Telecommunications Research Institute (ETRI), "A study of S/W Migration Context Information Management Method for Ubiquitous Environment", 33rd Asian Info-Communications Council Conference, Nov. 21-25, 2005, 15 pages.

(Continued)

*Primary Examiner* — Hanh Thai
(74) *Attorney, Agent, or Firm* — Ladas & Parry LLP

(57) ABSTRACT

An apparatus and method for managing application context is provided. A first one of a plurality of terminals, each including at least one application, collects and transmits context information of the application to a migration server so that it is stored and managed in the migration server. The migration server transmits the stored and managed context information to a second terminal corresponding to the first terminal in response to a request of the second terminal. The second terminal restores context based on the context information received from the migration server. This can reproduce the same application and desktop environments as those previously set to be suitable for each work situation, thereby increasing user convenience.

14 Claims, 7 Drawing Sheets

(56) References Cited

U.S. PATENT DOCUMENTS

| | | | | |
|---|---|---|---|---|
| 7,203,944 | B1 * | 4/2007 | van Rietschote et al. | 718/104 |
| 7,379,996 | B2 * | 5/2008 | Papatla et al. | 709/224 |
| 7,475,282 | B2 * | 1/2009 | Tormasov et al. | 714/6 |
| 7,506,204 | B2 * | 3/2009 | Soderberg et al. | 714/27 |
| 7,558,840 | B1 * | 7/2009 | Howard et al. | 709/219 |
| 7,577,720 | B2 * | 8/2009 | Vertes et al. | 709/219 |
| 7,610,291 | B2 * | 10/2009 | Cannon et al. | 1/1 |
| 7,805,583 | B1 * | 9/2010 | Todd et al. | 711/162 |
| 2002/0004890 | A1 * | 1/2002 | Ofek et al. | 711/161 |
| 2004/0044721 | A1 | 3/2004 | Song et al. | |
| 2004/0153973 | A1 | 8/2004 | Horwitz | |
| 2005/0038848 | A1 * | 2/2005 | Kaluskar et al. | 709/201 |
| 2005/0038849 | A1 * | 2/2005 | Kaluskar et al. | 709/203 |
| 2005/0055402 | A1 * | 3/2005 | Sato | 709/205 |
| 2005/0193227 | A1 * | 9/2005 | Nakahara et al. | 714/4 |
| 2006/0036658 | A1 * | 2/2006 | Henrickson | 707/204 |
| 2006/0090049 | A1 * | 4/2006 | Saika | 711/162 |
| 2008/0126445 | A1 * | 5/2008 | Michelman | 707/204 |
| 2008/0163073 | A1 * | 7/2008 | Becker et al. | 715/753 |
| 2008/0288749 | A1 * | 11/2008 | McKenney et al. | 712/28 |

OTHER PUBLICATIONS

Dag Johansen, et al; "Environment Mobility Moving the Desktop Around", 2004, 2nd Workshop on Middleware for Pervasive and AdHoc Computing, Toronto, Canada, 5 pages.

Byeong-Thaek Oh, et al; "A Study on Common Application Context Migration Method for Mobile Environment", Proceedings of DCS-2005 International Digital Contents Conference, Dec. 2, 2005, pp. 183-189.

USPTO NFOA mailed Nov. 25, 2008 in connection with U.S. Appl. No. 11/602,021.

USPTO FOA mailed May 13, 2009 in connection with U.S. Appl. No. 11/602,021.

USPTO NOA mailed Oct. 16, 2009 in connection with U.S. Appl. No. 11/602,021.

* cited by examiner

APPARATUS AND METHOD FOR MANAGING APPLICATION CONTEXT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

The present application is based on, and claims priorities from, Korean Application Number 2005-121814, filed Dec. 12, 2005 and Korean Application Number 2006-41680, filed May 9, 2006, the disclosure of which is incorporated by reference herein in its entirety.

BACKGROUND OF THE INVENTION

1. Field of the Invention

The present invention relates to an apparatus and method for managing application context, and more particularly to an apparatus and method for managing context which allows a user of a terminal to selectively collect and restore work environments (i.e., context information) of applications installed and used on the terminal.

2. Description of the Related Art

A method for collecting and restoring context information of office applications used for general purposes has not yet been standardized. This method also depends on internal interfaces provided by each application. Thus, it is difficult to simultaneously collect and restore context information from a variety of applications, so that it is difficult to manage the application context information. Conventionally, since application context information is not classified and unmanageable, methods which requires a user to store and restore a variety of context information of running applications personally by using a storage device are used to migrate context information even when only one application is running.

That is, since application context to be migrated is not classified and unmanageable, the user cannot selectively collect and restore context. For example, in conventional context information collection and restoration methods, application context information of MS Office is collected using a COM object on the MS Windows operating system, but the method may not be used for other applications on the same operating system, and also application context information of Linux Open Office is collected using a system call in the Linux operating system, but the method may not be used for other applications on the same operating system. Since these methods depend on each application, it is difficult for these methods to simultaneously collect context of a variety of applications on one operating system. Also, these conventional methods cannot selectively store and restore context desired by the user since context information of each office application cannot be classified to be collected. Thus, to store and restore context information, the user must personally migrate all context information including undesired context information or migrate only data of each application.

Using the conventional methods to collect, transmit, and restore all context information makes it impossible to individually select and restore context suitable for each work situation and is also very inefficient while causing security problems. Thus, there is a need to provide an apparatus and method which simultaneously supports a variety of applications and also allows selective collection and restoration of application context information desired by the user.

SUMMARY OF THE INVENTION

Therefore, the present invention has been made in view of the above problems, and it is an object of the present invention to provide an apparatus and method for managing application context, wherein context information of office applications used for general purposes is classified and context information selected by a user is collected and transmitted to a server and then the context information transmitted to the server is stored and managed therein while being classified according to users, context types, and work situations so that it is possible to restore a work environment suitable for each work situation.

It is another object of the present invention to provide an apparatus and method for managing application context which allows the user to select and download their own context information stored in a server after passing through an authentication process with a current terminal or with another terminal after moving to another place, thereby providing a convenient continuous work service to the user.

It is yet another object of the present invention to provide an apparatus and method for managing application context, wherein information, which the user desires to migrate, from among information of desktop environments and application work environments such as the position of a toolbar of an MS or Linux office program, the position and size of a window, a file with which the user is currently working, a current URL of the Internet Explorer, a moving image file which is being played by a Media Player and its playback position, and a music file which is being played by an MP3 player and its playback position is selectively collected and stored and application context information suitable for a situation and time desired by the user is selectively restored, so that the same environment as the previous environment which the user set to be suitable for each situation and in which the user was working is restored, thereby allowing the user to do a continuous work.

In accordance with one aspect of the present invention, the above and other objects can be accomplished by the provision of an apparatus for managing application context, the apparatus comprising a plurality of terminals, each of which includes at least one application, collects context information of the application, and restores context using the collected context information; and a migration server that receives and stores collected context information from a first one of the plurality of terminals and transmits the context information to a second one of the plurality of terminals.

Preferably, each of the plurality of terminals includes an application, context information of which is to be collected; an connection Application Programming Interface (API) that receives a list of context from the migration server, receives selection information of context information to be migrated from a user, and collects the selected context information; and a migration client that transmits the context information collected by the connection API to the migration server so that the collected context information is stored in the migration server, requests the stored context information from the migration server, and restores context using the context information received from the migration server in response to the request.

Preferably, the migration server includes a user manager that manages and authenticates terminal users; an application manager that manages a list of applications that can be migrated and a list of context that is collectable from the applications and manages application context information received from the first terminal; a storage that stores the application list, the collectable context list, and the application context information received from the first terminal; and a desktop manager that manages a list of desktop-related context information.

In accordance with another aspect of the present invention, there is provided a method for managing application context in an application context management apparatus including a plurality of terminals and a migration server that cooperates with the plurality of terminals through a communication network, the method comprising collecting and transmitting, by a first terminal including at least one application, context information of the application to the migration server; storing the context information in the migration server; transmitting the stored context information from the migration server to a second terminal corresponding to the first terminal in response to a request of the second terminal; and restoring, by the second terminal, context based on the context information received from the migration server.

Preferably, collecting and transmitting, by the first terminal, the context information of the application to the migration server includes receiving a migratable list from the migration server; extracting a list of migratable context from the received migratable list; outputting the extracted context list and allowing a user to select context information to be migrated; and collecting and transmitting the selected context information to the migration server.

Preferably, restoring, by the second terminal, the context based on the context information received from the migration server includes transmitting a context information list request signal to the migration server; receiving a context information list from the migration server; allowing a user to select context information to be restored based on the context information list; and receiving the selected context information and restoring application context.

More preferably, restoring, by the second terminal, the context based on the context information received from the migration server further includes transmitting an authentication request signal to the migration server; and receiving an authentication response signal front the migration server.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
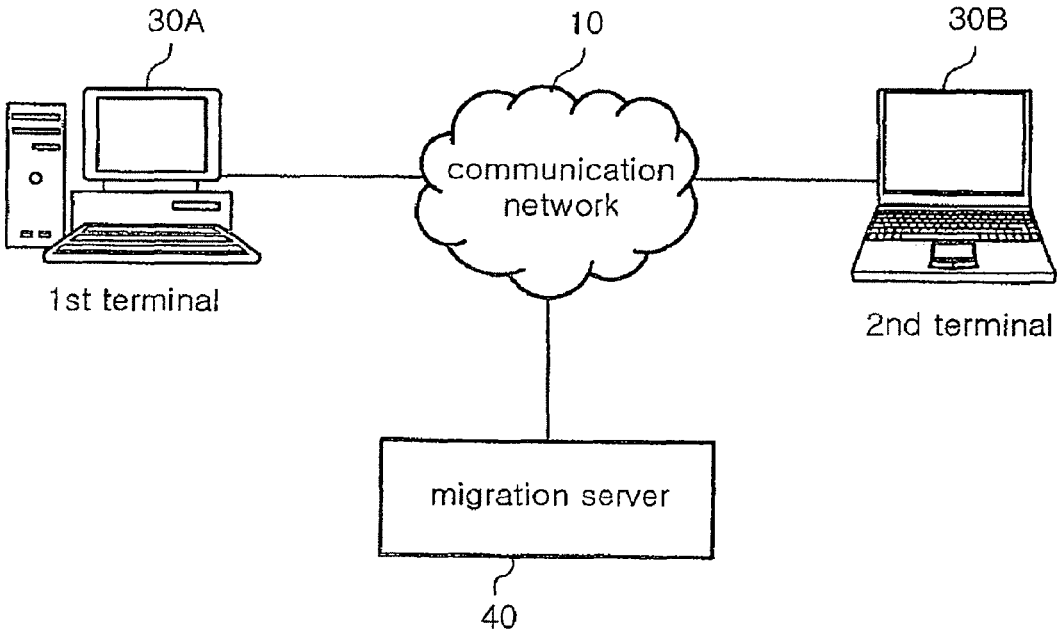
FIG. 1 illustrates the configuration of an application context management apparatus according to an embodiment of the present invention.

Preferred embodiments of the present invention will now be described in detail with reference to the accompanying drawings. In the drawings, the same or similar elements are denoted by the same reference numerals even though they are depicted in different drawings. In the following description of the present invention, a detailed description of known functions and configurations incorporated herein will be omitted when it may obscure the subject matter of the present invention.

FIG. 1 illustrates the configuration of an apparatus for managing application context according to an embodiment of the present invention.

As shown in FIG. 1, the application context management apparatus according to the present invention includes terminals 30A and 30B, a communication network 10, and a migration server 40.

The terminals 30A and 30B are coupled to the migration server 40 through the communication network 10. Each of the terminals 30A and 30B includes a PC, a PDA, a tablet PC, or a notebook computer that includes hardware, a device driver, and an operating system. The communication network 10 includes the wired and wireless Internet and includes any communication line and network capable of communicating with the migration server 40.

Each of the terminals 30A and 30B includes at least one application. The user works using applications on the first terminal 30A while changing a variety of work environments to be suitable for each work situation. If migration is automatically activated as the user moves to another place or migration is manually activated after the user selects and sets a plurality of context to be migrated from a list of migratable context, then the plurality of selected context information is collectively collected from each application and temporarily stored in the first terminal 30A and is then transmitted to the migration server 40 through the communication network 10 so that it is stored in the migration server 40.

Thereafter, when the user works using another terminal (i.e., the second terminal 30B) or returns to the first terminal 30A to work, the user can restore the previous work environment by connecting to the migration server 40 through the communication network 10 using the terminal 30B or 30A and then selectively downloading context information stored in the migration server 40 after being authenticated.

The first and second terminals 30A and 30B can exchange context information with the migration server 40 through a communication protocol. For example, a simple object access protocol (SOAP) can be used as the communication protocol. Although the embodiments of the present invention will be exemplified by the SOAP, other communication protocols can be used. Details of the SOAP will be explained later in the description of FIG. 8.

Figure 2:
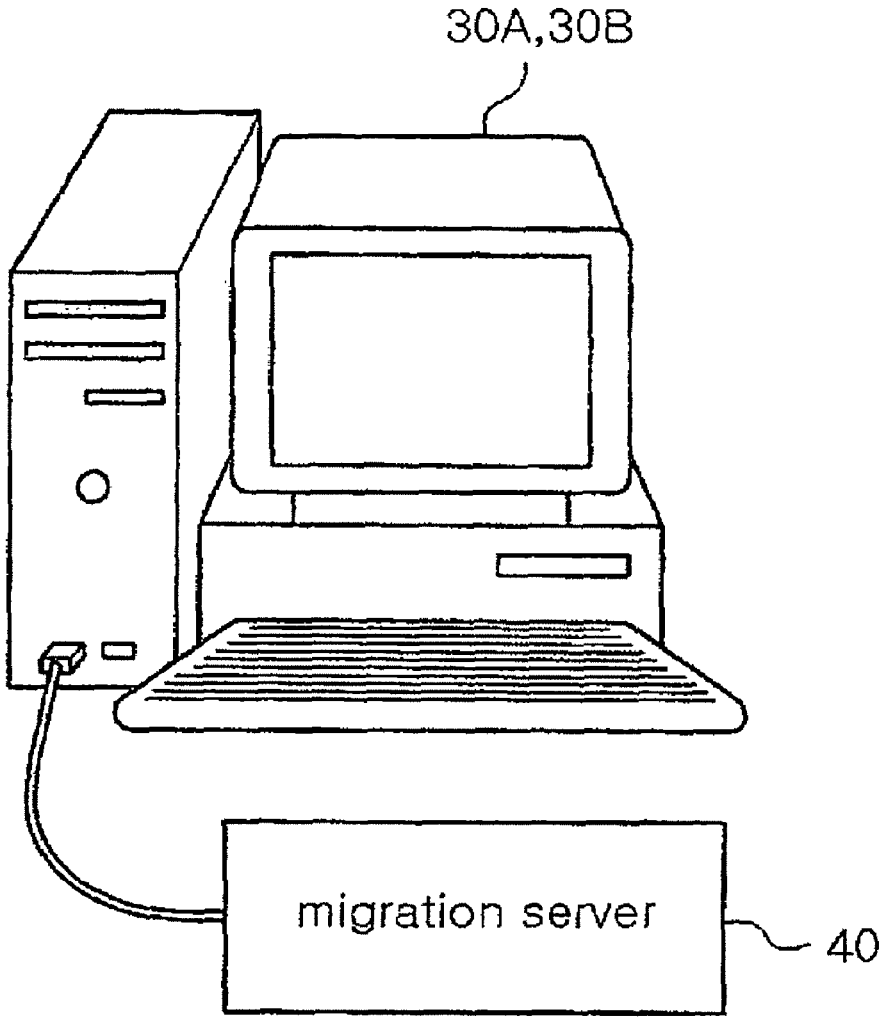
FIG. 2 illustrates an external appearance of a terminal and a migration server coupled to each other through a USB port according to an embodiment of the present invention.

FIG. 2 illustrates an external appearance of a terminal and a migration server coupled to each other through a USB port according to an embodiment of the present invention.

As shown in FIG. 2, the migration server 40 according to the present invention may be included in a portable storage device such as a portable memory device and a mobile hard drive and can be coupled to a variety of ports, such as a USB port, supported by the terminals 30A and 30B. The user of the terminal 30A or 30B selects context information, which they desire to migrate, among context of an application that is running on the terminal 30A or 30B, and transmits the selected context information to the migration server 40 coupled to the terminals 30A and 30B through the USB port so that it is stored in the migration server 40. Thereafter, when the user works on another terminal, the user couples the terminal to the migration server 40 through a USB port and downloads desired context information from the migration server 40 so that the user can work in the same environment as that in which the user was working on the previous terminal.

Figure 3:
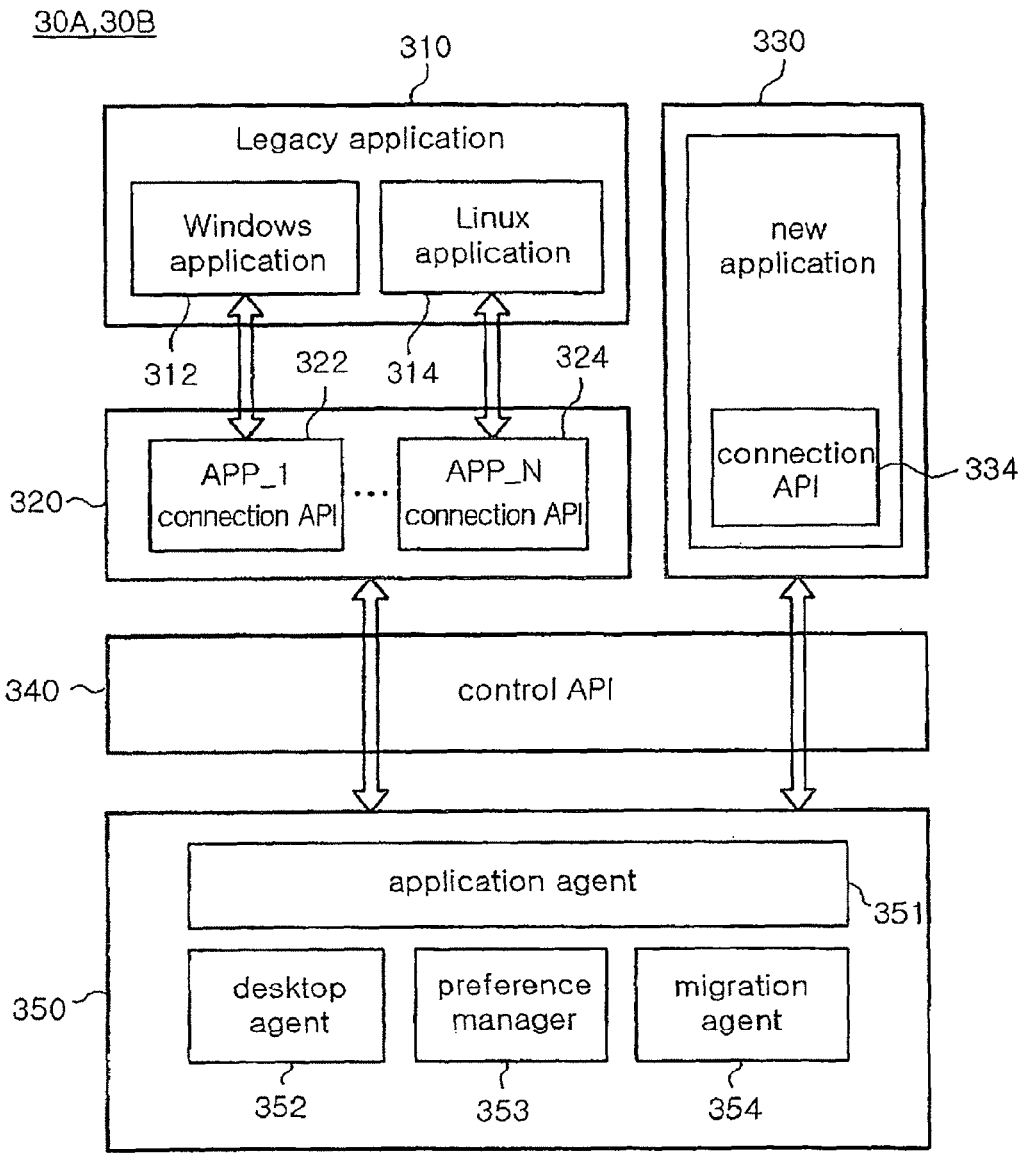
FIG. 3 illustrates an internal configuration of a terminal which collects and restores context according to an embodiment of the present invention.

FIG. 3 illustrates an internal configuration of the terminal according to an embodiment of the present invention.

As shown in FIG. 3, each of the terminals 30A and 30B includes legacy applications 310, connection application programming interfaces (APIs) 320, a new application 330, a control API 340, and a migration client 350.

The legacy applications 310 are applications which were developed in the past and each of which is a target of the context collection. The legacy applications 310 include a Windows application 312, a Linux application 314, etc. Context information of the legacy applications 310 can be collected by the connection APIs 320. It is necessary to provide a connection API 320 for each operating system or application. For example, a connection API 322 for collecting context information using a COM object is required for the Windows application 312 such as Windows Office and a connection API 324 for collecting context information using a system call or the like is required for the Linux application 314 such as Linux Open Office. The new application 330 is an application that was newly developed to include a connection API 334.

The migration client 350 is a client program that performs overall control of the function to migrate context information of the applications 310 and 330. Specifically, the migration client 350 functions to collect context information of the applications 310 and 330 through the connection APIs 320 and 334 and then to transmit the collected context information to the migration server 40 or functions to receive and restore context information stored in the migration server 40. The migration client 350 collects the context information of the applications through the standardized control API 340. The control API 340 is an interface that collectively collects and restores context information selected by the user from the applications through the context APIs 320 and 334 and that controls a function to terminate and start each of the applications to provide the context migration service.

The migration client 350 includes an application agent 351, a desktop agent 352, a user preference manager 353, and a migration agent 354. The application agent 351 has a function to extract and restore application context information through the standardized control API 340 and the desktop agent 352 has a function to extract and restore desktop environment context information. The user preference manager 353 has a function to store and restore selection information of context, which the user desires the migration client 350 to collect, and preference information of the migration client 350. The migration agent 354 performs overall control of the context information collection and restoration of the migration client 350.

Although not illustrated, each of the terminals 30A and 30B may include a memory, at least one central processing unit (CPU) that is coupled to the memory to perform high speed operations, and an input unit. The CPU includes an arithmetic logic unit (ALU) that performs calculation, a register that temporarily stores data and commands, and a controller that controls the operation of the terminal. The CPU may be a processor with one of a variety of architectures such as an Alpha processor of Digital, MIPS processors of MIPS Technology, NEC, IDT, and Siemens, x86 processors of Intel, Cyrix, AMD, Nexgen, and others, and PowerPC processors of IBM and Motorola. The input device includes a keyboard and a mouse. For example, the mouse may include a physical transducer such as a microphone or a touch screen.

Figure 4:
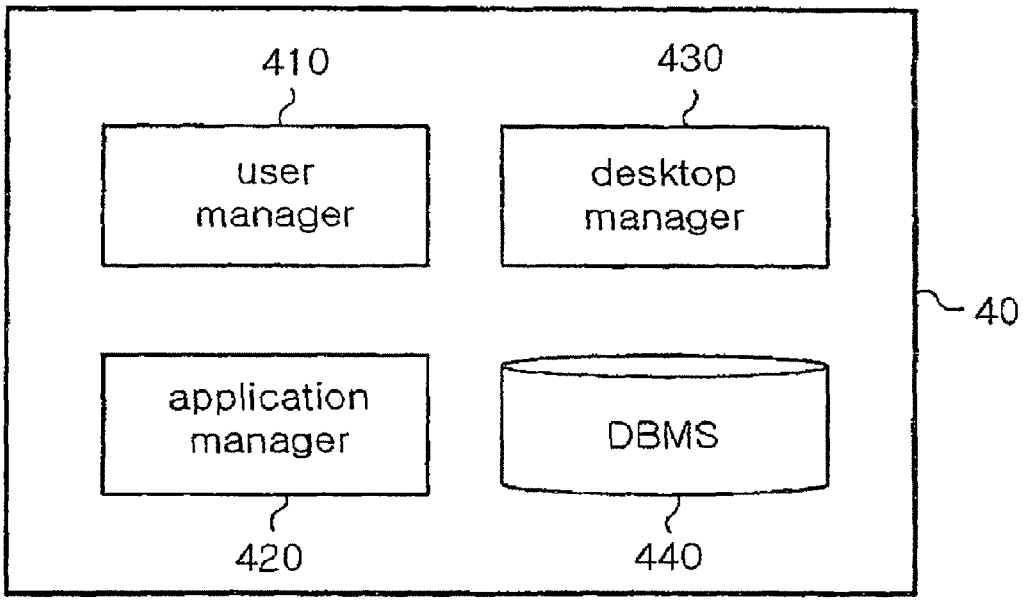
FIG. 4 illustrates an internal configuration of a migration server according to an embodiment of the present invention.

FIG. 4 illustrates an internal configuration of the migration server according to an embodiment of the present invention.

As shown in FIG. 4, the migration server 40 performs a function to store and manage context information received from the migration client of the terminal and thereafter to transmit the context information to the terminal when receiving a context information request from the terminal. The migration server 40 includes a user manager 410, an application manager 420, a desktop manager 430, and a storage (for example, a DBMS) 440. The migration server 40 may be included in a portable storage device as described above with reference to FIG. 2.

The user manager 410 in the migration server 40 functions to manage and authenticate users who use the application context management apparatus. The application manager 420 manages a list of migratable applications and a list of context information that can be collected from the applications. The application manager 420 functions to collect a list of migratable context from information of environments of the terminals and the applications installed on the terminals and then to provide the collected context list to the user. The application manager 420 also functions to manage a list of application context information transmitted from each terminal. The desktop manager 430 functions to manage a list of desktop-related context information. All the context information is converted into a database, which is then stored and managed in the DBMS 440 in the migration server 40.

Figure 5:
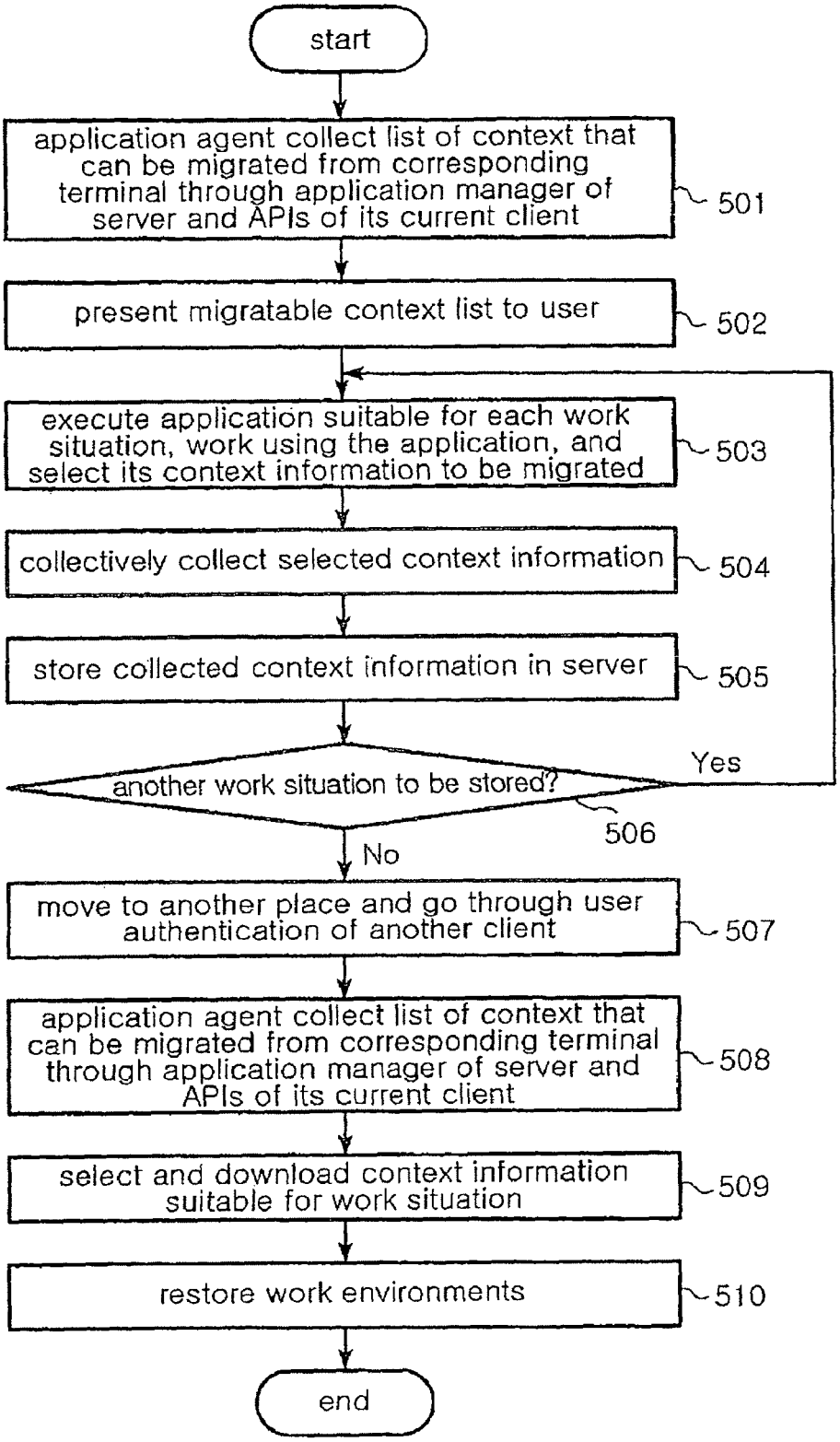
FIG. 5 is a flow chart of a procedure for collecting, storing, and restoring context information according to an embodiment of the present invention.

FIG. 5 is a flow chart of a procedure for storing and restoring context information according to an embodiment of the present invention.

As shown in FIG. 5, at step 501, the application agent 351 in the first terminal 30A collects a list of migratable context from applications installed on the terminal through the control API 340 and the connection APIs 320 in the first terminal and the application manager 420 of the migration server 40. Thereafter, at step 502, the application agent 351 in the first terminal 30A presents the migratable context list to the user.

At step 503, the user executes an application suitable for a work situation. While the user works with the application, the application agent 351 of the first terminal 30A receives selection information of context information, which the user desires to migrate, from the user through a user interface (UI) of the migration client 350. At step 504, the migration client 350 in the first terminal 30A collectively collects and temporarily stores the selected context information. Thereafter, at step 505, the migration client 350 in the first terminal 30A terminates the application with which the user is working and transmits the collected context information to the migration server 40 through a communication network.

At step 506, if another context to be stored is present, the procedure proceeds to step 503 and, if any other context to be stored is not present, the procedure proceeds to step 507. In this manner, the user can configure application work environments suitable for a variety of work situations and collect and store context of the work environments.

Thereafter, at step 507, when the user moves to another place and accesses another terminal (the second terminal 30B in this example) to work, the second terminal 30B connects to the migration server 40 and performs an authentication process in order to restore the context stored in the migration server 40. After the authentication process, the second terminal 30B collects, at step 508, a list of context which can be migrated to the second terminal through the application manager 420 of the migration server 40 and the control API 340 and the connection APIs 320 of the second terminal. At step 509, when the user selects a desired work situation from the list, the migration client 350 of the second terminal 30B receives context information corresponding to the selected work situation from the migration server 40. At step 510, based on the received context information, the migration client 350 of the second terminal 30B restores the same data and UI environments as those of applications, with which the user was working on the previous terminal, in the second terminal 30B.

Figure 6:
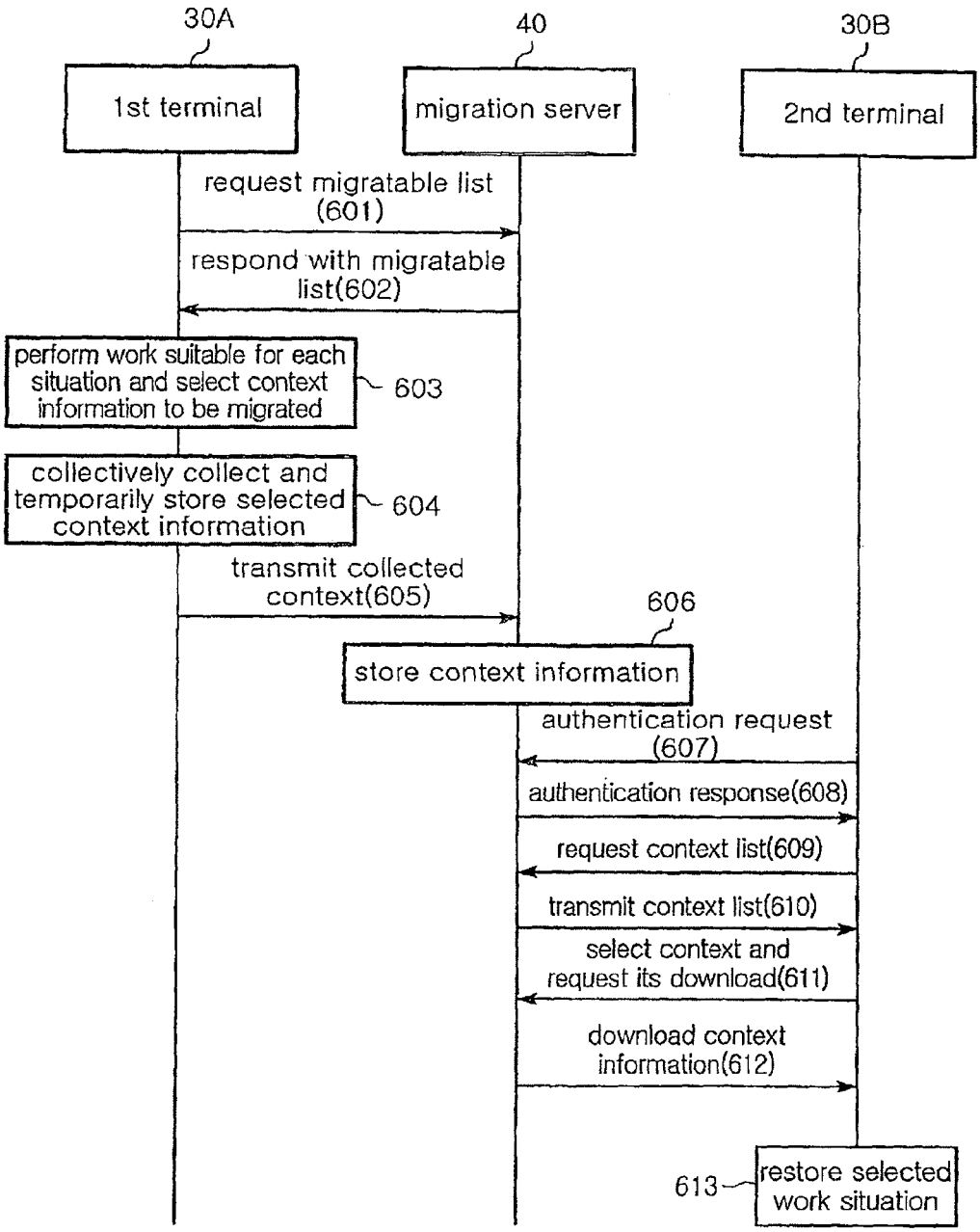
FIG. 6 is a signal flow diagram illustrating a procedure for collecting, storing, and restoring context information according to an embodiment of the present invention.

FIG. 6 is a signal flow diagram illustrating a procedure for storing and restoring context information according to an embodiment of the present invention.

As shown in FIG. 6, at step 601, the first terminal 30A transmits a request signal, which requests a list of applications supporting the migration and a list of context of the applications, to the migration server 40. At step 602, the migration server 40 transmits a migratable list to the first terminal 30A. Based on the migratable list received from the migration client 350, the migration client 350 of the first terminal 30A presents a list of context, which can be migrated from the first terminal 30A, and allows the user to select desired context information.

After the user performs a work suitable for each situation and selects context information to be migrated at step 603, the migration client 350 of the first terminal 30A collectively collects the selected context information and temporarily stores it in the first terminal 30A at step 604. At step 605, the migration client 350 of the first terminal 30A transmits the collected context information to the migration server 40. At step 606, the migration server 40 stores the context information received from the first terminal 30A in the DBMS.

Thereafter, at step 607, the second terminal 30B connects to the migration server 40 and transmits an authentication request signal to the migration server 40 in order to restore context information stored in the migration server. Although the second terminal 30B may be different from the first terminal 30A, it may also be the same as the first terminal 30A when it is necessary to restore the previous work environment of the first terminal 30A since it has been formatted or it has lost some data or for other reasons.

When the user authentication is completed, the migration server 40 transmits, at step 608, an authentication response signal to the second terminal 30B. At step 609, the second terminal 30B then transmits a stored context list request signal to the migration server 40.

At step 610, the migration server 40 transmits the stored context list to the second terminal 30B. Then, at step 611, based on the context list received from the migration server 40, the migration client 350 of the second terminal 30B presents a list of context, which can be restored by the second terminal 30B, to the user and then requests context information, selected by the user, from the server 40.

Thereafter, at step 612, the migration server 40 extracts and transmits the requested context information to the second terminal 30B. At step 613, the migration client 350 of the second terminal 30B restores a corresponding work environment of the application based on the context information received from the migration server 40.

Figure 7:
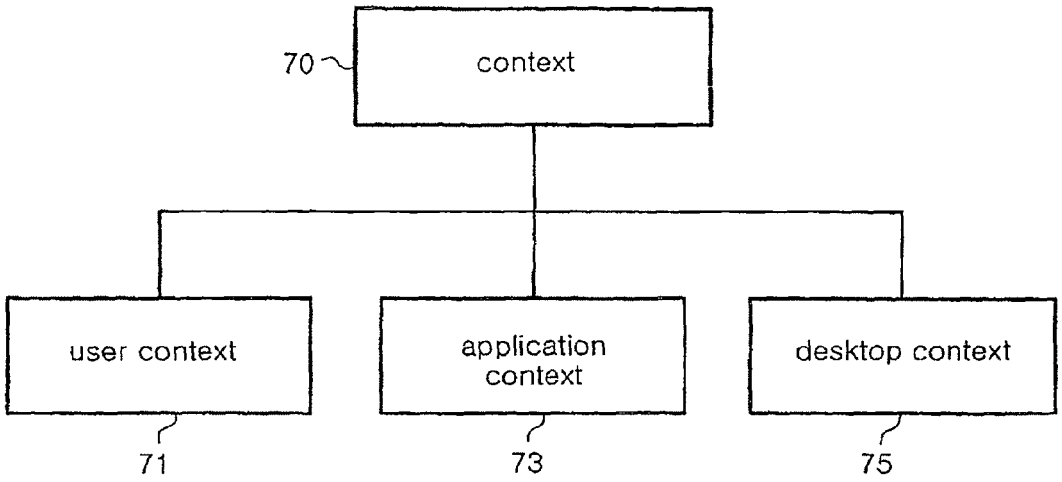
FIG. 7 illustrates classification of collectable context information according to an embodiment of the present invention.

FIG. 7 illustrates collectable context information according to an embodiment of the present invention.

As shown in FIG. 7, context 70 is managed while being classified into user context 71, application context 73, and desktop context 75.

The user context 71 includes information regarding optional items which the user has set for migration, a personal schedule for automatic restoration of context information, migration information, and a personal folder to be migrated. The application context 73 includes the position of a toolbar of each application, arrangement of icons, the size and position of a window on which the user is working, a data file with which the user is working, an opened page of the data file, a currently connected URL, environment setting information (i.e., configuration information), a multimedia file that is being played, and a playback position of the multimedia file. The desktop context 75 includes OS background image information, window theme information, shortcuts, toolbar setting information, and the like.

For example, at a certain moment while the user works on a document with MS Office, a Power Point, a web browser, and an MP3 player running, the user selects a work environment required to be migrated from work environments of that moment so that context information of the selected work environment is collected and stored through the migration client. Thereafter, while doing a different work with Microsoft Paint, Hangul, and Excel programs running, the user stores a corresponding work environment in the migration server. After moving to another place, the user selects a desired environment from the stored environments to restore corresponding context such as work data including a previously set window size and the like, the same page as that of a document with which the user was working, and a music data position at which music was being played, thereby reproducing the desired one of the stored environments in which the user was working. Simply put, if the user moves to another place and goes through an authentication process using another terminal after context information items which the user has selected to be migrated are automatically stored, then it is possible to immediately reproduce the last work environment that has been automatically stored.

Figure 8:
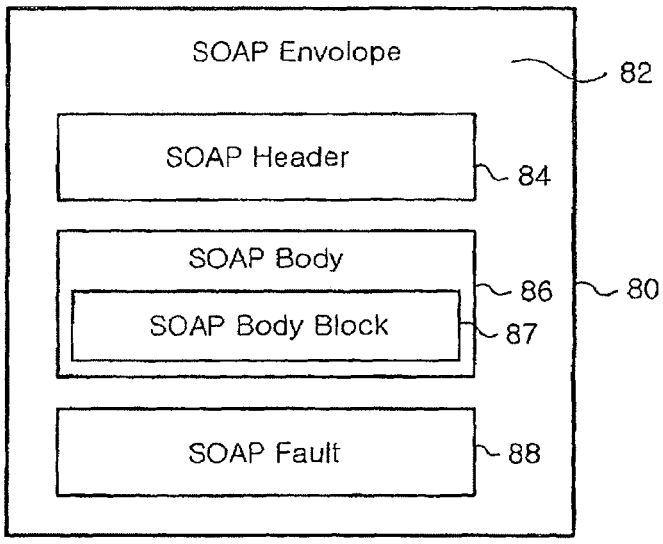
FIG. 8 illustrates the structure of a Simple Object Access Protocol (SOAP) message for communication between a terminal and a migration server according to an embodiment of the present invention.

FIG. 8 illustrates the structure of a Simple Object Access Protocol (SOAP) message for communication between a terminal and a migration server according to an embodiment of the present invention.

The SOAP is a lightweight protocol for exchanging structured information in a distributed environment. The SOAP uses XML to define an extensible message framework and provides a message structure that allows data to be exchanged using a variety of lower-level protocols. This framework is designed so as to be independent of specific programming models or implementation methods. The SOAP is an object access protocol which can provide a variety of definitions for referring to remotely located objects.

The SOAP can be used for any application since it is based on XML which is an industry standard. As most firewalls permit only the web port (Port 80), SOAP messaging is mostly performed depending on the HTTP. According to the SOAP specifications, not only the migration server but also the terminal can analyze SOAP messages since SOAP messages are two-way messages rather than one-way messages.

As shown in FIG. 8, a SOAP message 80 mainly includes a SOAP envelope 82, a SOAP header 84, a SOAP body 86, and a SOAP fault 88. The SOAP envelop 82 is the highest level element of the SOAP message 80 to envelop the SOAP message 80 and includes the header 84 and the body 86.

The SOAP header 84 serves to add a function to the SOAP message 82 although the SOAP header 84 is not essential in the message. The SOAP header 84 includes a plurality of blocks for containing a variety of information and is the first element following the envelope tag. The SOAP header 84 is used for administrative purposes such as encoding, authentication, and transaction.

The SOAP body 86 is filled with data to be transmitted through the SOAP. The SOAP body 86 may include a plurality of blocks 87 which are filled with a requested web service name and associated parameters when the SOAP message is a request message and which are filled with result information when it is a response message.

The SOAP fault 88 is an area in which information of a messaging error occurring after SOAP processing is filled. To describe details of the error, the SOAP fault 88 supports elements such as "faultcode", "faultstring", "faultfactor", and "detail".

The faultcode element uses a code to identify the type of the error. By viewing this code, web service consumers can determine which type of error has occurred. While the code contains machinery information, the faultstring element provides error information that can be read and understood by human beings. The faultfactor element is used to inform where an error has occurred during a messaging process. As error data associated with the SOAP body 86, the detail element is used when SOAP messaging has failed. If no detail element is present even when an error has occurred, it is determined that no error has occurred at a portion associated with the body 86.

As described above, according to the present invention, while the user works using an application in a work environment suitable for each work situation, corresponding application context and desktop context can be collected to be stored and managed in the migration server.

In addition, any terminal which has passed through user authentication can select and download context information suitable for each work situation from the migration server and then can restore the same application and desktop environments as those previously set to be suitable for each work situation. After the user moves to another place, the same application and UI environments as previous ones suitable for each work situation such as work data, an application window size and position, a toolbar setting, and a multimedia file playback position are provided to allow the user to utilize context information suitable for each situation of the user in any place, thereby increasing user convenience.

Further, the present invention allows development of an applied application product that supports related services. Applying the present invention also makes it possible to develop a product that supports a mobile work environment service using a storage device such as a USB memory rather than the context migration server.

The method according to the present invention can be implemented as a program and then be stored in a computer-readable recording medium such as a CD-ROM, a RAM, a ROM, a floppy disk, a hard disk, and a magneto-optic disc. This process can be easily carried out by those having ordinary skill in the art and thus a more detailed description thereof is omitted.

As is apparent from the above description, the present invention provides an apparatus and method for managing application context, wherein a plurality of application work data and environment information, which the user has selected to be migrated, is collected together and collectively stored in a server and, thereafter, the user selects the stored application context information to be restored, thereby reproducing the same application and desktop environments as those previously set to be suitable for each work situation, thereby increasing user convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

[1. An apparatus for managing application context, the apparatus comprising:

a plurality of terminals, each of which includes at least one application, collects context information of the application, and restores context using the collected context information, by using connection Application Programming Interface (API), and a migration server that receives and stores collected context information from a first one of the plurality of terminals and transmits the context information to a second one of the plurality of terminals or vice versa, wherein a user is able to work on the second terminal with the same working state consists of the same application, user interface and data based on the context information received from the migration server from the user on the first terminal by correctly restoring a selected previous collected context information, which is the context information last worked on by the user on the first terminal, from the migration server by connecting to the migration server, and wherein the context information received by the second one of the plurality of terminals from the migration server from the last context information last worked on by the user on the first one of the plurality of terminals is unclassified or unmanageable to the second one of the plurality of terminals.]

[2. The apparatus according to claim 1, wherein the context information is classified into user context, application context, and desktop context.]

[3. The apparatus according to claim 2, wherein the user context includes information regarding optional items which a user has set for migration and a personal folder to be migrated together with context information;

the application context includes the position of a application toolbar, arrangement of icons, the size and position of a window on which the user is working, a data file with which the user is working, an opened page of the data file, a currently connected URL, environment setting information, a multimedia file that is being played, and a playback position of the multimedia file; and the desktop context includes OS background image information, window theme information, shortcuts, and toolbar setting information.]

[4. The apparatus according to claim 1, wherein each of the plurality of terminals includes:

at least one application, context information of which is to be collected;

an connection that receives a list of context from the migration server, receives selection information of context information to be migrated from a user, and collects the selected context information; and a migration client that transmits the context information collected by the connection API to the migration server so that the collected context information is stored in the migration server, requests the stored context information from the migration server, and restores context using the context information received from the migration server in response to the request.]

[5. The apparatus according to claim 4, wherein the migration client includes:

an application agent that extracts and restores application context information through the connection API and a standardized control API that is provided between the connection API and the migration client;

a desktop agent that extracts and restores context information of a desktop environment of the terminal;

a user preference manager that stores and restores selection information of context which the user desires to collect and preference information of the migration client; and a migration agent that performs overall control of the context information collection and restoration.]

[6. The apparatus according to claim 4, wherein the migration client further includes a control API that provides a standardized interface between the connection API and the migration client.]

[7. The apparatus according to claim 4, wherein, if the application is a new application, the application includes the connection API.]

[8. The apparatus according to claim 1, wherein the migration server includes:

a user manager that manages and authenticates user information;

an application manager that manages a list of applications that can be migrated and a list of context that is collectable from the applications and manages application context information received from the first terminal; and a storage that stores the application list, the collectable context list, and the application context information received from the first terminal.]

[9. The apparatus according to claim 8, wherein the migration server further includes a desktop manager that manages a list of desktop-related context information.]

[10. The apparatus according to claim 8, wherein the migration server can be included in a portable storage device.]

[11. A method for managing application context in an application context management apparatus including a plurality of terminals and a migration server that cooperates with the plurality of terminals through a communication network, the method comprising:

collecting and transmitting, by a first terminal including at least one application, context information of the application to the migration server, by using connection Application Programming Interface (API);

storing the context information in the migration server;

transmitting the stored context information from the migration server to a second terminal corresponding to the first terminal in response to a request of the second terminal; and restoring, by the second terminal, context based on the context information received from the migration server or vice versa, wherein a user is able to work on the second terminal with the same working state consists of the same application, user interface and data based on the context information received from the migration server from the user on the first terminal by correctly restoring a selected previous collected context information, which is the context information last worked on by the user on the first terminal, from the migration server by connecting to the migration server, and wherein the context information received by the second one of the plurality of terminals from the migration server from the last context information last worked on by the user on the first one of the plurality of terminals is unclassified or unmanageable to the second one of the plurality of terminals.]

[12. The method according to claim 11, wherein collecting and transmitting, by the first terminal, the context information of the application to the migration server includes:

receiving a migratable list from the migration server;

extracting a list of migratable context from the received migratable list;

outputting the extracted context list and allowing the user to select context information to be migrated; and collecting and transmitting the selected context information to the migration server.]

[13. The method according to claim 11, wherein restoring, by the second terminal, the context based on the context information received from the migration server includes:

transmitting a context information list request signal to the migration server;

receiving a context information list from the migration server;

allowing a user to select context information to be restored based on the context information list; and receiving the selected context information and restoring application context.]

[14. The method according to claim 13, wherein restoring, by the second terminal, the context based on the context information received from the migration server further includes:

transmitting an authentication request signal to the migration server; and receiving an authentication response signal from the migration server.]

*15. A method for providing context information to a user for restoring a work environment in a plurality of terminals networked together with a migration server, the method comprising:*

*receiving context information at the migration server of a first one of a plurality of terminals last worked on by the user;*

*storing the received context information at the migration server;*

*receiving a connection request at the migration server from a second one of the plurality of terminals;*

*receiving a request signal at the migration server for context information from the second one of the plurality of terminals; and*

*transmitting from the migration server the stored context information to the second one of the plurality of terminals which restores the work environment at the first one of the plurality of terminals based upon the received context information,*

*wherein the context information received by the second one of the plurality of terminals from the migration server from the last context information last worked on by the user on the first one of the plurality of terminals is unclassified or unmanageable to the second one of the plurality of terminals.*

*16. The method of claim 15, wherein the context information transmitted from the migration server or received at the migration server is selected by the user of the first one of the plurality of terminals or the second one of the plurality of terminals.*

*17. The method of claim 15, further comprising:*

*receiving at the migration server a request signal for a list of migratable context information from the first one of the plurality of terminals; and*

*transmitting from the migration server the list of migratable context information to the first one of the plurality of terminals.*

*18. The method of claim 15, further comprising:*

*receiving at the migration server a request signal for a list of the stored context information from the second one of the plurality of terminals; and*

*transmitting from the migration server the list of stored context information to the second one of the plurality of terminals in response to the request signal received the migration server from the second one of the plurality of terminals.*

*19. The method of claim 15, wherein the context information includes at least one of position of an application toolbar, arrangement of icons, size and position of a window on which the user is working, a data file with which the user is working, an opened page of the data file, a currently connected URL, environment setting information, a multimedia file that is being played and a playback position of the multimedia file.*

*20. The method of claim 15, further comprising:*

*receiving at the migration server an authentication request signal from the second one of the plurality of terminals;*

*performing at the migration server user authentication; and*

*transmitting from the migration server an authentication response to the second one of the plurality of terminals.*

*21. A user terminal network for restoring work environment within the network, the network comprising:*

*a plurality of terminals networked together, each terminal comprising:*

*an input unit configured to receive input from a user;*

*a processing unit configured to:*

*transmit a request signal for context information for restoring work environment to a migration server;*

*receive the context information from the migration server; and*

*restore the work environment based upon the context information received from the migration server; and*

*a memory unit configured to store the received context information,*

*wherein the context information received by the second one of the plurality of terminals from the migration server from the last context information last worked on by the user on the first one of the plurality of terminals is unclassified or unmanageable to the second one of the plurality of terminals.*

*22. The user terminal network of claim 21, wherein the user's input comprises selection of context information to request from the user and the context information to be received is determined by the selection of the user.*

*23. The user terminal network of claim 21, wherein the processing unit is further configured to:*

*transmit a request signal for a list of stored context information to the migration server;*

*receive the list of stored context information from the migration server;*

*provide the list of stored context information for the user; and*

*receive context information selected by the user for restoring.*

*24. The user terminal network of claim 21, wherein the processing unit performs the above functions automatically or in response to the input from the user.*

*25. A method of restoring work environment within a plurality of terminals interconnected within a network, the method comprising:*

*transmitting from a first one of a plurality of terminals a request signal for context information to a migration server;*

*receiving the context information at a second one of the plurality of terminals from the migration server;*

*storing the received context information at the second one of the plurality of terminals; and*

*restoring at the second one of the plurality of terminals the work environment based upon the context information received from the migration server,*

*wherein the context information received by the second one of the plurality of terminals from the migration server from the last context information last worked on by the user on the first one of the plurality of terminals is unclassified or unmanageable to the second one of the plurality of terminals.*

*26. The method of claim 25, further comprising receiving at the second one of the plurality of terminals user's selection of context information to request,*

*wherein the context information to be received or transmitted is determined by the selection of the user.*

*27. The method of claim 25, further comprising*

*transmitting from the first second of the plurality of terminals a request signal for a list of stored context information to the migration server;*

*providing by the second one of the plurality of terminals the transmitted list of stored context information for the user; and*

*receiving at the second one of the plurality of terminals user's selection of context information to use for restoring.*

*28. The method of claim 25, wherein the above steps are performed automatically or in response to input from the user.*

* * * * *